Figure 1:
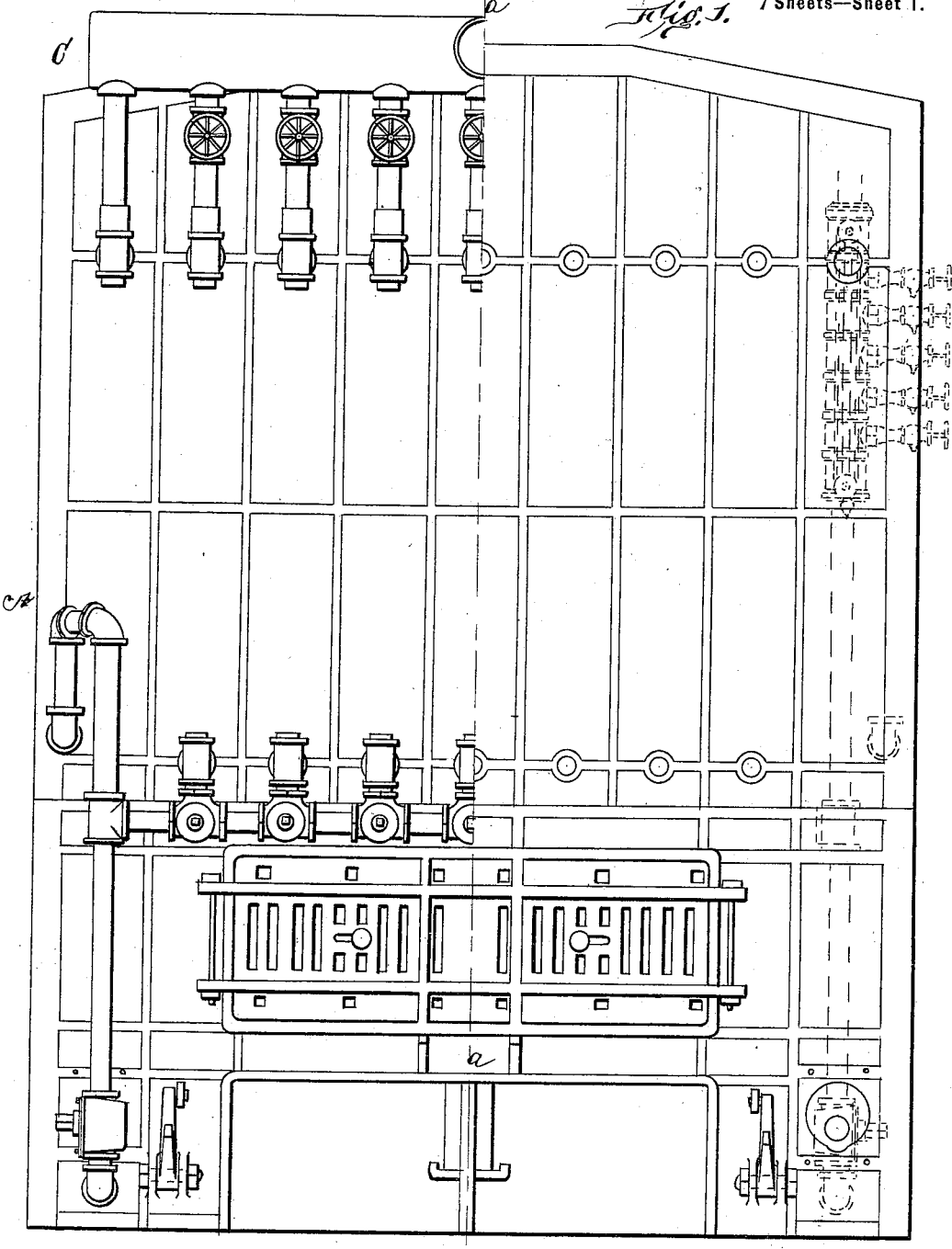

No. 621,557. Patented Mar. 21, 1899.
O. T. EARLE & C. W. NEWTON.
SECTIONAL STEAM GENERATOR.
(Application filed June 20, 1898.)
(No Model.) 7 Sheets—Sheet 1.

Witnesses
F. C. Barry
M. H. Haskell

Inventors
C. W. Newton &
per Oscar T. Earle
Attorney

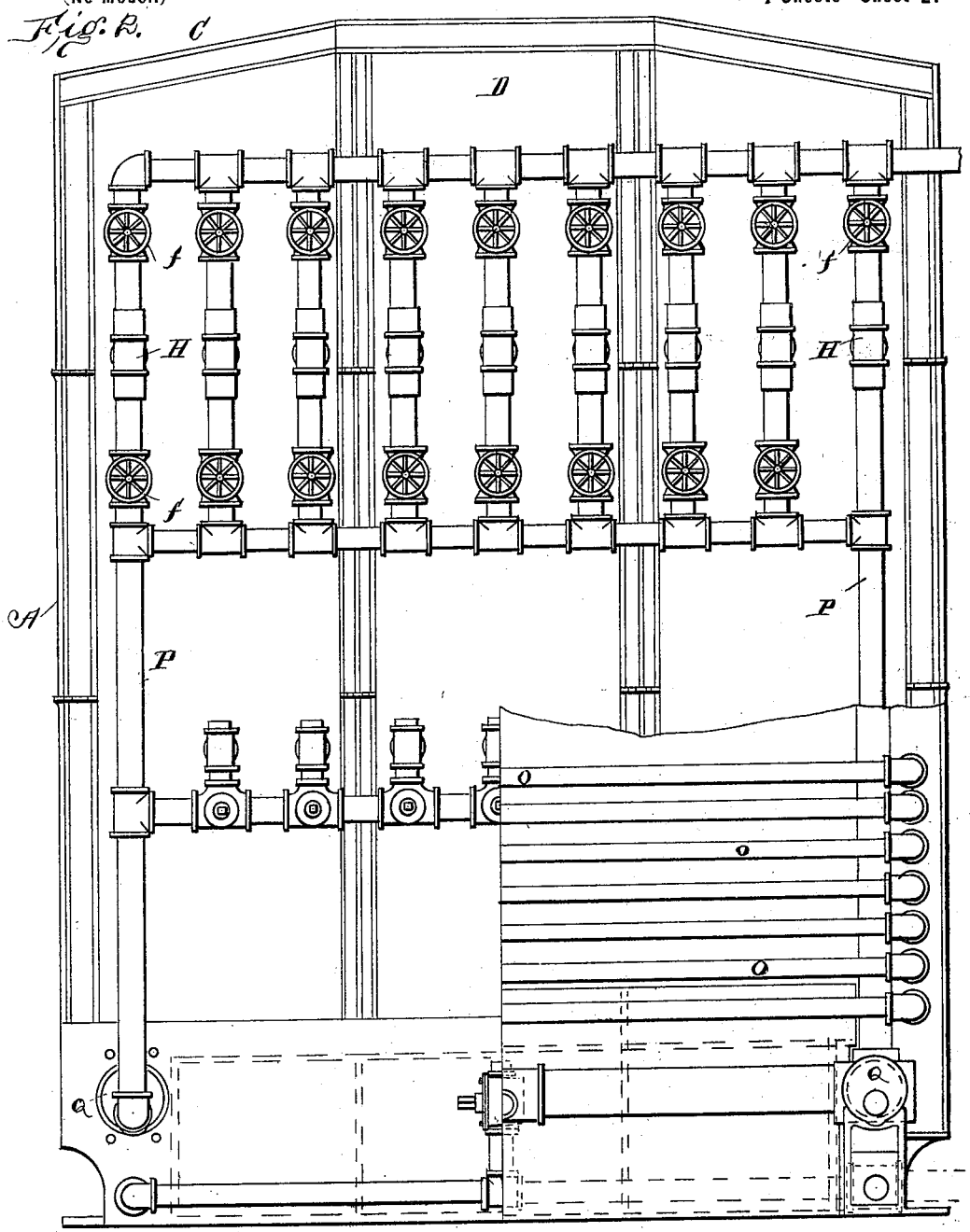

No. 621,557. Patented Mar. 21, 1899.
O. T. EARLE & C. W. NEWTON.
SECTIONAL STEAM GENERATOR.
(Application filed June 20, 1898.)
(No Model.) 7 Sheets—Sheet 3.
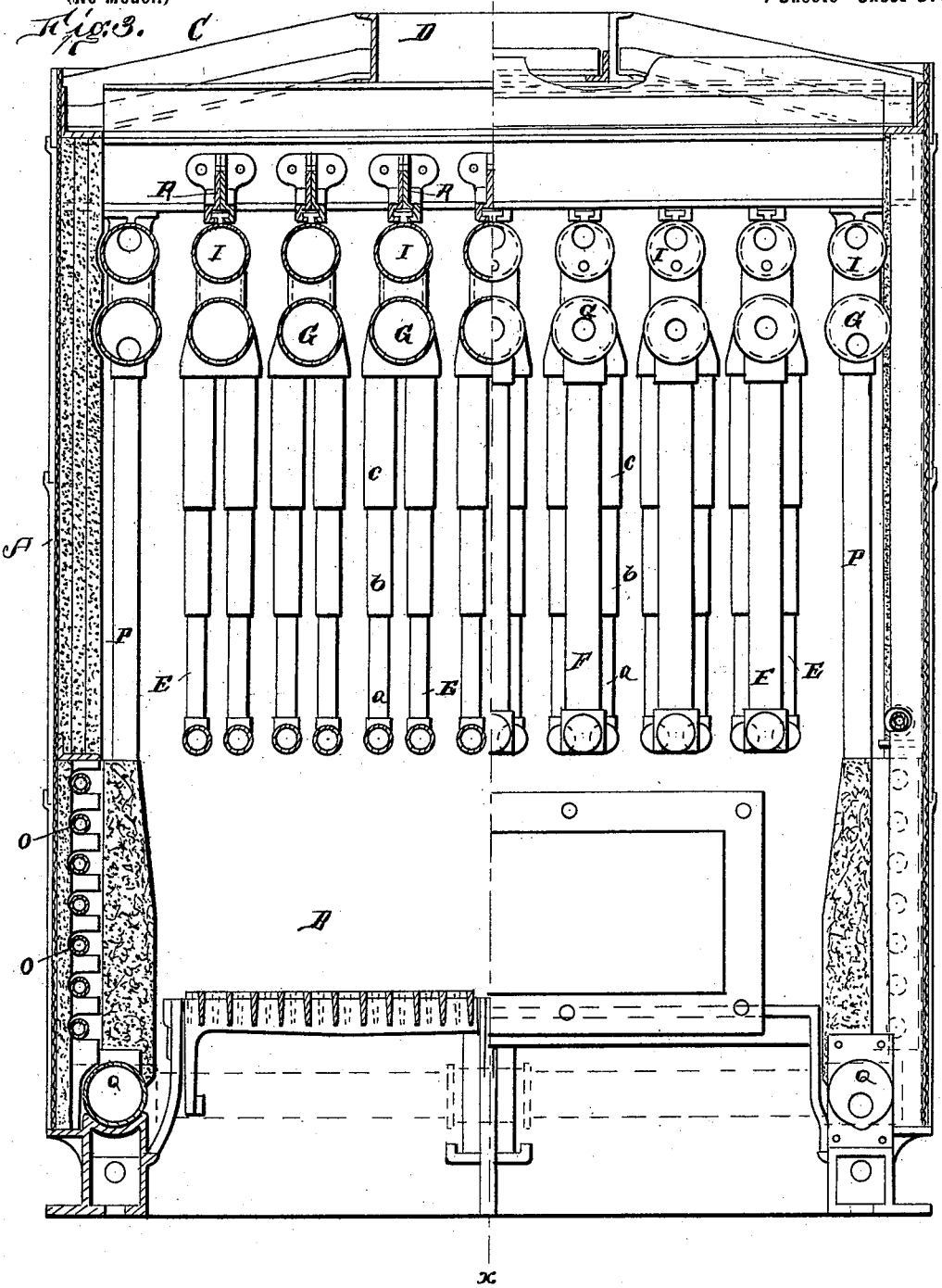

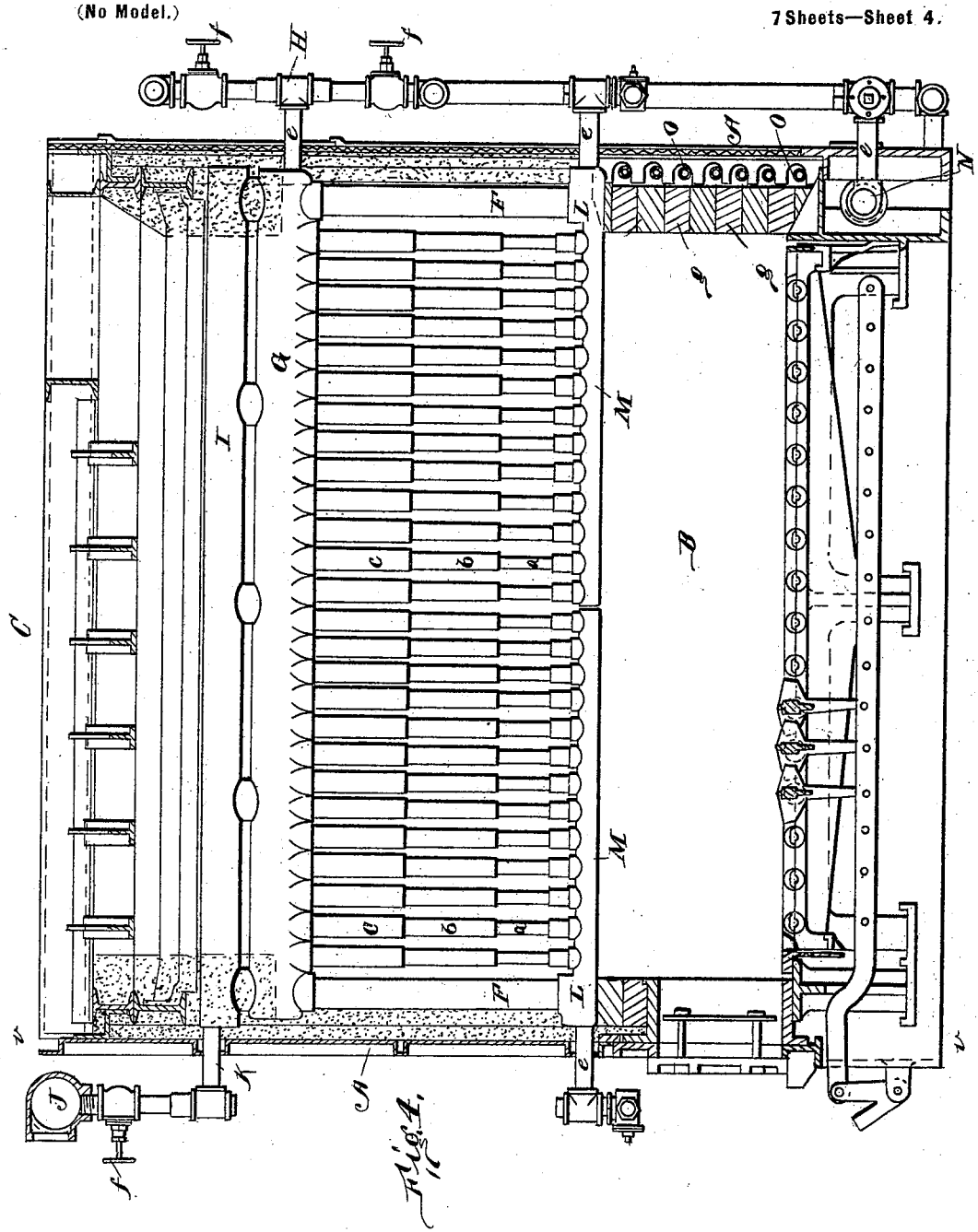

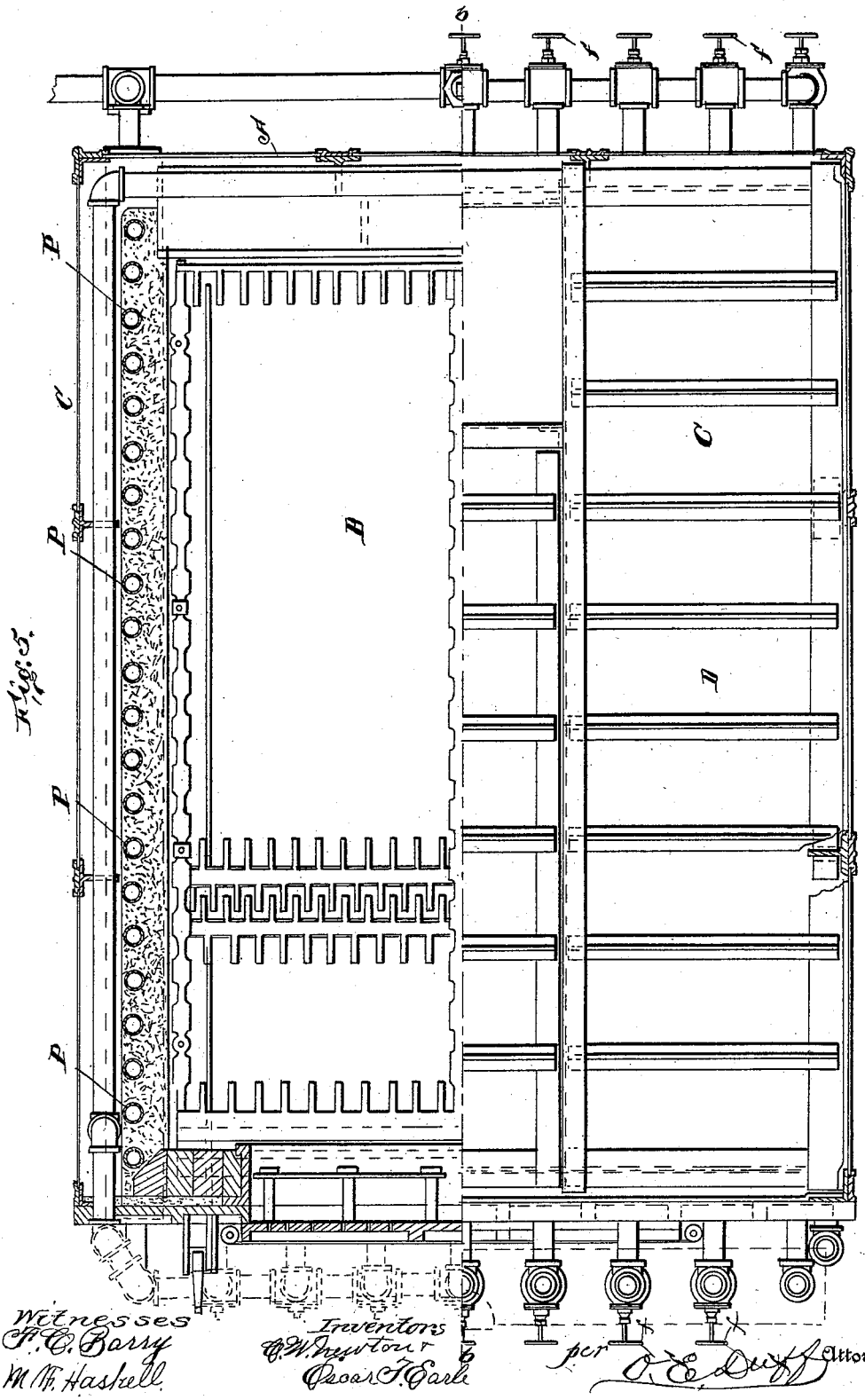

No. 621,557. Patented Mar. 21, 1899.
O. T. EARLE & C. W. NEWTON.
SECTIONAL STEAM GENERATOR.
(Application filed June 20, 1898.)
(No Model.) 7 Sheets—Sheet 6.
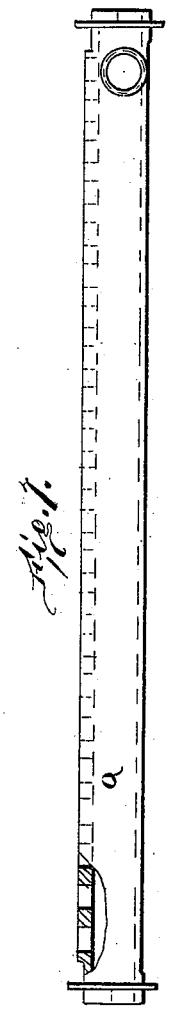
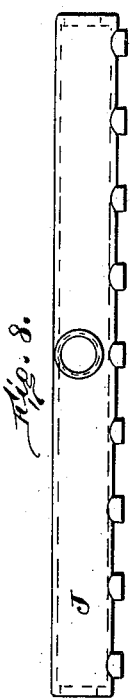
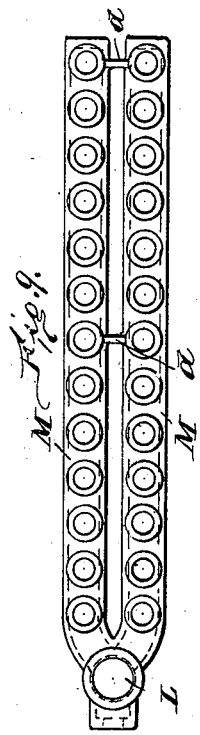
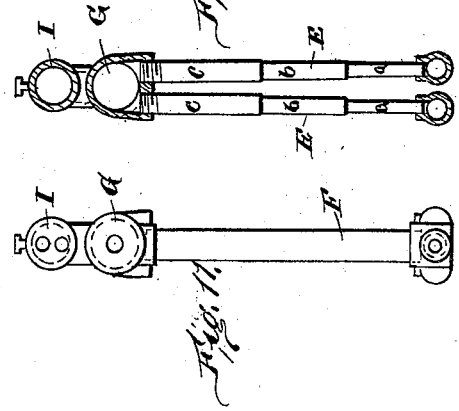
Witnesses
Inventors No. 621,557. Patented Mar. 21, 1899.
O. T. EARLE & C. W. NEWTON.
SECTIONAL STEAM GENERATOR.
(Application filed June 20, 1898.)
(No Model.) 7 Sheets—Sheet 7.
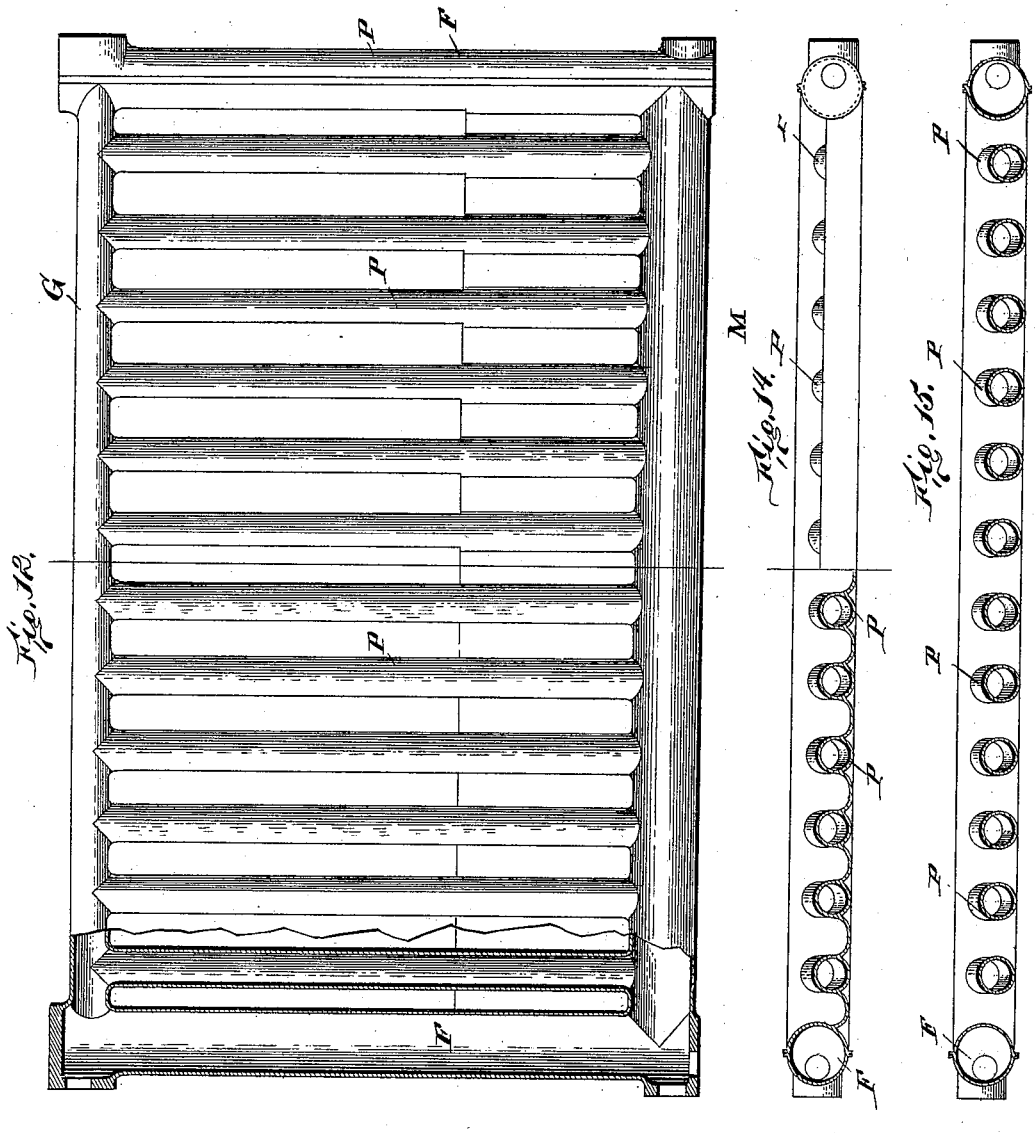

UNITED STATES PATENT OFFICE.

OSCAR T. EARLE AND CHARLES W. NEWTON, OF BALTIMORE, MARYLAND.

SECTIONAL STEAM-GENERATOR.

SPECIFICATION forming part of Letters Patent No. 621,557, dated March 21, 1899.

Application filed June 20, 1898. Serial No. 683,995. (No model.)

*To all whom it may concern:*

Be it known that we, OSCAR T. EARLE and CHARLES W. NEWTON, of Baltimore, in the State of Maryland, have invented certain new and useful Improvements in Sectional Steam-Boilers; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to that class of steam-generators known as "sectional water-tube boilers," and has for its objects simplicity in construction, efficiency in use, rapidity in generating steam, and economy in fuel, giving off the greatest maximum heating power to the least minimum in fuel.

A further object of the invention is the facility by which the generators may be increased or diminished in size by the addition or withdrawal of sections without any departure from the original designs, thereby increasing or reducing the amount of power required.

A further object of the invention is the rapid and continuous circulation of the water in the boiler without lifting it, which, after all, is the great consideration in the rapid generation of steam, and by such rapid circulation the tubes and sections are kept clean and bright in their inner surfaces, and a further object is to provide for easy and free separation of the steam from the water, and thus prevent priming and foaming, thus supplying to the engine clear dry steam.

A further object is to so suspend the several sections constituting the boiler on slides or ways by which a disabled section may be readily withdrawn and a new section substituted therefor without interfering with the working of the boiler.

A further object of the invention is to heat the feed-water by a very simple means before it enters the boiler and without additional fuel. This latter function is accomplished by the water passing through a series of return-bend tubes in the rear of the boiler, and thence through heater-sections provided for said purpose; and a further object of the invention is the new contour of the multisizable and multiaxial generating-sections by which the steam is rapidly generated, rapidly separated, and released on its ascent to the steam-chamber.

The invention consists in the new construction of the sections, their arrangement, the slidable sections suspended from ways, the manner of cutting off disabled sections and substituting others, the arrangement of the steam and water drums, the circulating and heating drums, and in other details of construction, as will be more fully hereinafter described, and pointed out in the claims.

In the drawings, Figure 1 represents a front elevation of the boiler, one-half of the connecting-pipes removed. (See dotted line $a\ a$ of this figure.) Fig. 2 shows a rear elevation partly in section, a portion being broken away to show the water-heating tubes. Fig. 3 shows a vertical section on the left half of line $x\ x$ and on the right a front elevation of several sections of the boiler with the front removed. Fig. 4 shows a vertical longitudinal section of the boiler through the fire-box, also showing the tubular sections and their circulating-sections. Fig. 5 shows a horizontal section on the left of line $b\ b$, over the grate, and on the right a top plan view. Fig. 6 is a side elevation, partly in section, of the water and steam drum. Fig. 7 shows lower manifold for mud-drum. Fig. 8 is the main-steam-pipe manifold. Fig. 9 is a plan view of the lower double manifold, in which is secured the small end of the multsizable sections. Fig. 10 is a detached view of one of the sections, showing the multisizable and multiaxial tubes having shoulders. Fig. 11 is an end detached view of one of the downflow-pipes, adapted for connection to the water-drum at its lower end and to the water and steam drums at its upper end. Fig. 12 is a side elevation, partly in section, of a water-heater which may be substituted for the downflow-pipes at either end of the boiler. Fig. 13 is a sectional end view of the side of heater shown by Fig. 12. Fig. 14 is a plan view of the upper manifold, partly in section and partly in elevation; and Fig. 15 is a perspective of the lower manifold of the heater shown by Fig. 12.

The same letters will indicate like parts throughout all the figures, in which—

A is the casing or walls of the generator; B, the fire-box; C, the top of the boiler, and D the uptake. The sides, top, and fire-box are of the usual character in such boilers and therefore will not require description.

In Fig. 3 the front is removed from right-hand side of the boiler, showing the sections E in position, also the downflow-pipe F, and on the left the sections E, with the downflow-pipes removed. The sections E are made of drop-tubes multisizable and multiaxial, as shown. (See Figs. 3 and 10.) These multiaxial tubes E are made as follows: The lower section of the tubes, as at $a$, is the smallest where the fire is hottest. The second section $b$ is larger and the third section $c$ is still larger. The shoulders formed by the sections retard the products of combustion in their ascent, whereby the heat is held longer in contact with said sections. All these sections are made integral with each other and may be added to at will. The small end $a$ is where the fire is hottest, and when the water flashes into steam the globules pass to the next larger section $b$, where they have more room for expansion, and thence into the still larger section $c$, where the steam and water become separated, passing into the drum G, where if any foreign substance or sediment arises it is blown off through the surface blow H or through the downflow P to the mud-drum Q. The steam then passes to the steam-drum I, where it becomes dry and superheated, and thence to the main steam-supply pipe J through the branch connections K. Each section is provided with a steam-escape pipe and a surface blowpipe, and they in turn are connected to manifolds, top and bottom; but it will be observed each section is independent of the other and is capable of being detached and a new one substituted, so that really each section is interchangeable.

Aboard of ship the ability of removing a section while being under steam is of incalculable value, and all that is required in such case is to simply remove a portion of the front and rear casings, shut off the section to be removed from the steam and water of the other sections when it becomes dead, then remove it, substitute another in its place, and make the connections, when the boiler is whole again.

Each section of the boiler has a downflow-pipe, as shown at F, which communicates with the steam and water drum G and steam-drum I, and manifold-drum L, the lower small end $a$ entering the double manifold M, (see Fig. 9,) which in turn connects with drum L, as shown. As many such sections may be used as are required. The double manifolds M M are rigidly secured together by braces $d$ $d$. The surface blow-offs are connected with a mud-drum N and lateral connections $e$ $e$ $e$. All these connections are provided with stop-cocks $f$ $f$ $f$, so that by means of the sections, the downflow-pipes, and the steam and water drums a most perfect circulation is maintained.

O O are feed-water pipes located in rear of the fire-box and are arranged between the outer casing and fire-brick lining, as shown at $g$ $g$, Fig. 4.

P P are side pipes (see Fig. 3) which connect the water and mud drums G Q. These side pipes are also good generators as well as good circulators.

A very important feature of this invention is the ways or slides R, by which the steam-generating sections are suspended and by means of which they can be removed and substituted. These ways R are secured to the cross-beams of the crown of the casing. There are as many ways R as there are sections in the boiler. The lower portions of way are provided with T-shaped recesses running longitudinally the length of the boiler, supported by any well-known means. There are fixed to the top of the steam-drum corresponding T-shaped projections S, which are made to fit into the grooves R of the supporting-beams.

The grooves R may, if required, be provided with antifriction rollers or balls, (not shown,) upon which the T-shaped support of the boiler-section may ride, and thus more easily be removed. As before stated, when a section is to be removed and another substituted a portion of the front is removed, as shown at Fig. 1, the section disconnected. It is pulled out on these slides or ways without further trouble and another substituted therefor without interfering with the operation of the generator.

It will be seen from the foregoing description that every facility is provided for easy and sure manipulation of a sectional marine boiler and that every inch of available space is utilized for converting water into steam in the most economical manner; that the capacity of the sections may be decreased or diminished; that the sections being suspended in the manner described there is provision made of contraction and expansion without the danger of wrenching of joints or weakening of parts; that the water in the boiler will not fill the steam-space by the rolling of the vessel nor when she is on her beam ends, as often the case with marine boilers, all of which will be readily understood by the engineer, and also that all the sections when in operation are in full communication with each other, that any one or more of the sections may be cut off when required by the use of the communicating cocks, and that either section may be cut off from below or above, as the case may be.

It will be understood that many details of this boiler are not described, as those skilled in the art will readily understand them. Nor do we wish to be confined to the exact shape and arrangement of the parts, as modifications can be made within wide scope of the spirit of our invention without departing therefrom.

Having thus described our invention, what we claim as new, and desire to secure by Letters Patent, is—

1. The combination in a sectional steam-generator of the multiaxial water-tube with shoulders whereby the ascending products of combustion are partially retarded with the double manifold, said manifold terminating in a pipe common to both as set forth.

2. The combination in a sectional steam-generator of the multiaxial water-tubes, the double manifold as set forth of the downflow-pipe.

3. The combination in a sectional steam-generator of the varied-sized water-pipes, the downflow-pipe having shoulders, the water and steam drum G, and the steam-drum I as set forth.

4. The combination in a steam-generator of the suspended multiaxial water-tubes, the steam, and steam and water drums, the downflow-pipe, and the surface blow-off pipe as set forth.

5. The combination in a sectional steam-generator of the suspended multiaxial water-tubes, their water and steam drum connections, the horizontal and vertical connection-pipe, said pipe being provided with cut-off cocks for each section, substantially as set forth.

6. The combination in a sectional steam-generator of the suspended drop-tubes, the steam and water drums, the downflow-pipe F, connected to said drop-tubes, the said sections of circulating water-tubes, and the water-heating tubes around the fire-box, all combined and arranged to rapidly generate steam substantially as set forth.

7. The combination in a sectional steam-generator each section being provided with a suspending attachment preferably T-shaped in cross-section, of the beam provided with a corresponding T-shaped groove, whereby each section may readily be removed and others substituted for the purpose herein described.

8. The combination in a sectional water-tube steam-generator, of the central tubes connected as described, of the side water-tube heater having a connecting-web between the tubes, the walls of said tubes being staggered of making one straight side, connecting-pipes as at P substantially as set forth.

In testimony that we claim the foregoing as our own we affix our signatures in presence of two witnesses.

OSCAR T. EARLE.
CHARLES W. NEWTON.

Witnesses:
HERBERT C. EMERY,
O. E. DUFFY.